United States Patent [19]
Osterlund et al.

[11] Patent Number: 4,846,581
[45] Date of Patent: Jul. 11, 1989

[54] REAR DISCHARGE-TWO WAY CONCRETE MIXER

[75] Inventors: Jan A. Osterlund, Camp Hill; Leroy C. Scatchard, York, both of Pa.

[73] Assignee: Osterlund Inc., Harrisburg, Pa.

[21] Appl. No.: 35,429

[22] Filed: Apr. 7, 1987

[51] Int. Cl.⁴ .............................................. B28C 5/18
[52] U.S. Cl. ...................................... 366/61; 180/321; 366/44
[58] Field of Search ............... 366/54, 606, 60, 61, 366/42, 43, 44, 220; 180/321, 324, 331; 212/160

[56] References Cited

U.S. PATENT DOCUMENTS

| | | | |
|---|---|---|---|
| 2,959,260 | 11/1960 | Johnson et al. | 212/160 |
| 3,059,716 | 10/1962 | Iserman et al. | 180/321 |
| 3,173,258 | 3/1965 | Hare et al. | |
| 3,233,765 | 2/1966 | Barnes | 180/327 |
| 3,391,811 | 7/1968 | Barnes | 180/327 |
| 3,402,805 | 9/1968 | Spellman, Jr. | 366/61 |
| 3,572,847 | 3/1971 | Luft | 180/321 |
| 3,679,018 | 7/1972 | Luft. | |
| 4,147,227 | 4/1979 | van der Lely | 180/324 |
| 4,318,451 | 3/1982 | Liggett | 180/327 |
| 4,516,655 | 5/1985 | Donahue | 180/321 |
| 4,527,656 | 7/1985 | Walbridge | 180/321 |
| 4,705,450 | 11/1987 | Gano | 180/324 |

FOREIGN PATENT DOCUMENTS 298422 10/1919 Fed. Rep. of Germany ...... 180/321
022513 2/1980 Japan .................. 180/321

Primary Examiner—Robert W. Jenkins
Attorney, Agent, or Firm—Sughrue, Mion, Zinn, Macpeak, and Seas

[57] ABSTRACT

A rear discharge concrete mixer vehicle having a chassis comprising a cab for the vehicle operator; control means in the cab for operation of the vehicle; a rotary drum on the vehicle chassis; a discharge chute associated with the rotary drum; and auxiliary control means on the chassis for operation of the vehicle remote from the cab.

8 Claims, 3 Drawing Sheets

REAR DISCHARGE-TWO WAY CONCRETE MIXER

BACKGROUND OF THE INVENTION:

1. Field of the Invention

This invention pertains to a service-type vehicle, structured to carry a typical rear discharge concrete mixing in-transit drum from a loading station to a dispensing site. This invention eliminates the difficulty experienced by drivers in maneuvering the vehicle to the dispensing site by providing controls at the rear of the vehicle whereby the vehicle is easily maneuvered.

2. Statement of the Prior Art

The prior art shows remote control steering for material handling vehicles. U.S. Pat. Nos. 4,516,655 and 4,318,451 illustrate these invention. U.S. Pat. No. 3,059,716 discloses a mechanism for permitting operation of a vehicle from a remote location such as the running board. U.S. Pat. No. 3,173,258 shows a rear control and drive means for a mixing drum of a concrete mixing vehicle. And U.S. Pat. Nos. 4,527,656 and 3,679,018 disclose dual station control means for a vehicle. Copies of these patents are attached and it is requested that they be made of record and considered during the prosecution of this application.

SUMMARY OF THE INVENTION:

This invention pertains to effective and efficient controls for maneuvering a dispensing vehicle to the dispensing site. The conventional in-transit mixers have a single fixed control system at the forward end of the vehicle. From this vantage point, the vehicle operator is required to maneuver the vehicle to the dispensing site. This often requires the aid of another person walking or standing in a location to give directions to the vehicle operator.

It is one object of this invention to provide a unique control system which permits the operator to maneuver the vehicle more effectively and thus reduce dispensing time and labor.

It is another object of this invention to provide a unique control system which permits the operator to maneuver the vehicle with the aid of controls in a cab mounted at the rear of the vehicle.

And still another object of this invention is to provide the operator of a dispensing vehicle with a rear platform having controls for maneuvering the vehicle (reverse or forward mode) without assistance from another person thus reducing dispensing time and labor.

And still another object of this invention is to provide a dispensing vehicle with a laterally movable rear platform having controls to permit maneuvering the vehicle and discharge chute more effectively at the dispensing site.

These and other objects of the invention will become apparent to those skilled in the art to which invention pertains from a reading of the following specification when taken in light of the annexed drawings.

DETAILED DESCRIPTION OF THE PREFERRED EMBODIMENT OF THE INVENTION

Figure 1:
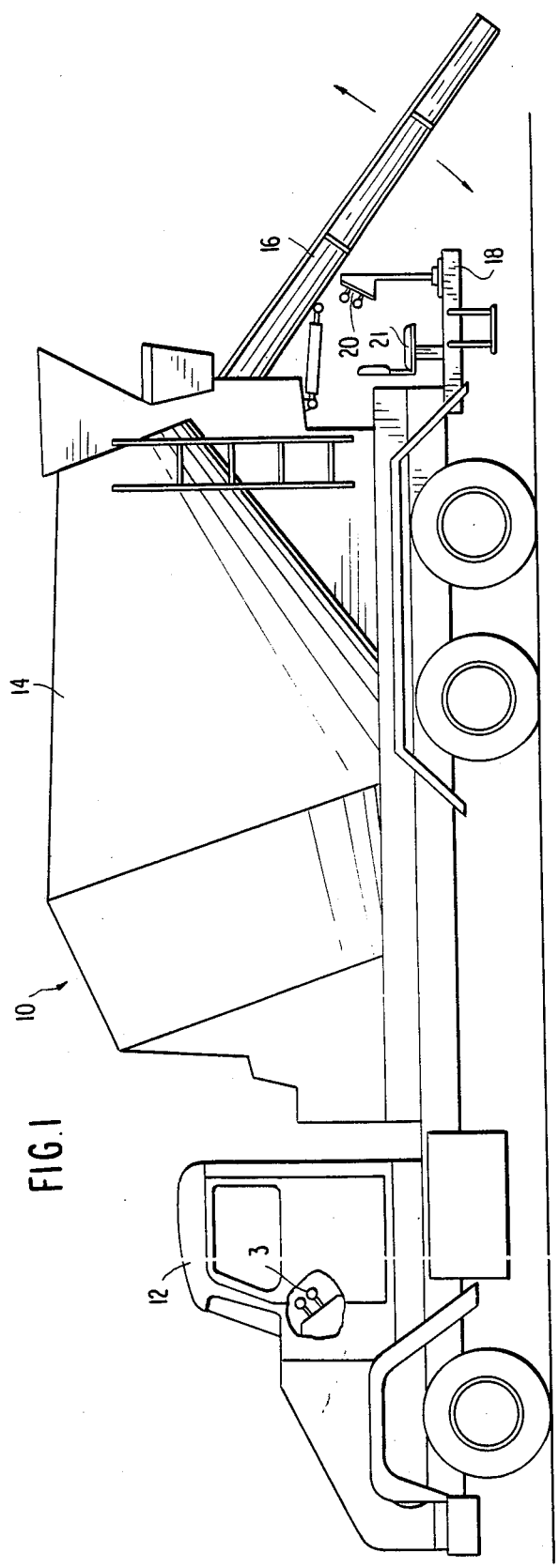
FIG. 1 is a side view of a rear discharge concrete mixing vehicle showing the dispensing chute and a rear platform whereby the operator can maneuver the vehicle and the discharge chute at the dispensing rate.
Figure 2:
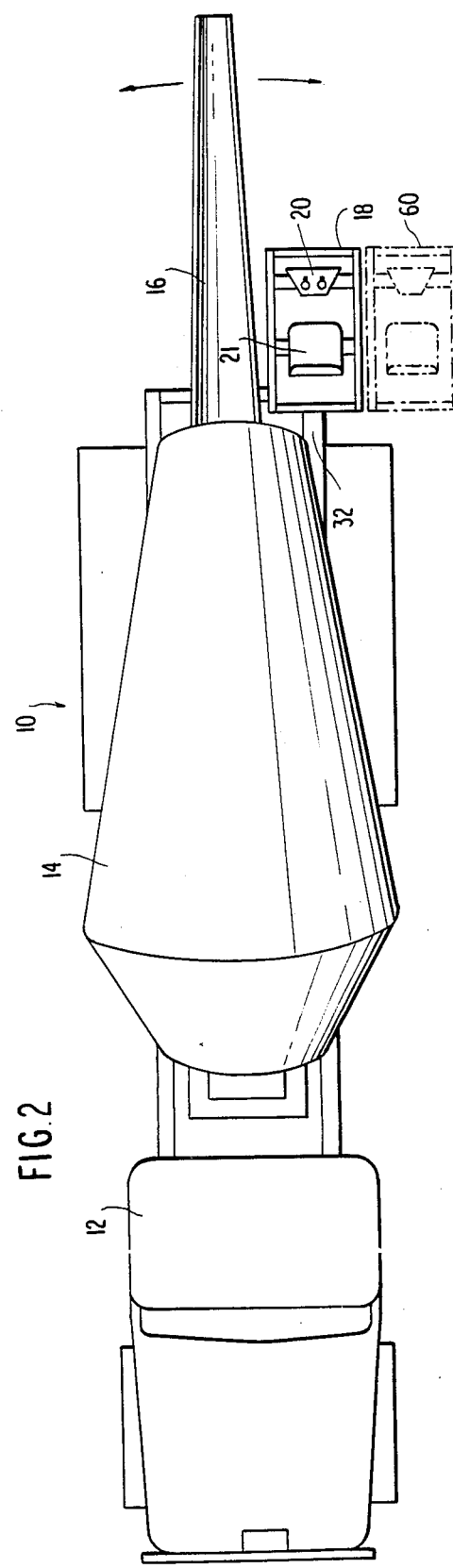
FIG. 2 is a top view of a rear discharge concrete mixing vehicle showing the dispensing chute and a rear platform whereby the operator can maneuver the vehicle and the discharge chute at the dispensing site.
Figure 4:
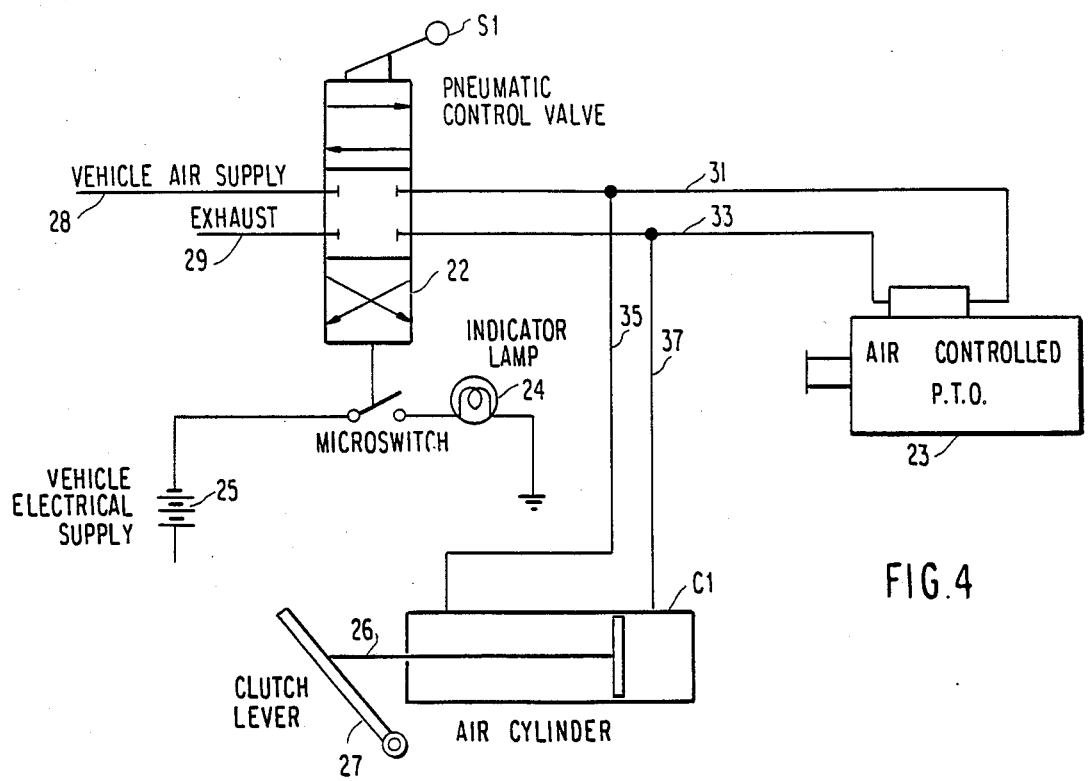
FIG. 4 is a schematic drawing showing the valving and controls for disconnecting the vehicle power from the conventional drive train.

Referring now in more detail to the drawing, FIG. 1 shows a rear discharge concrete mixer 10 having a front cab 12 with controls 13 for over the road operation of the vehicle, an in-transit mixing drum 14 having a discharge chute 16 and a rear control platform 18 with controls 20 and a seat 21 thereon. Upon reaching the dispensing site, the usual operation is for the operator to back the dispensing vehicle to the dispensing site. This often requires the assistance of another person to help direct the operator maneuver the vehicle rearwardly. This invention eliminates the time and labor used in maneuvering the vehicle to the dispensing site. In this regard, upon arrival at the dispensing site, the operator activates selector switch S1 in the cab, FIG. 4, having a pneumatic control valve 22 with indicator light 24 and vehicle electric supply 25. The selector switch S1 will activate pneumatic cylinder C1 through lines 35 and 37 coming off lines 31 and 33 at the same time that the power take off (PTO) 23 engages the vehicle transmission. Cylinder C1 having piston 26 pushes against clutch lever 27 which disengages the vehicle clutch. Power from the diesel engine 39 is now locked out from the conventional drive train. The value 22 has an air supply line 28 and an exhaust line 29 as are known in the art.

Figure 3:
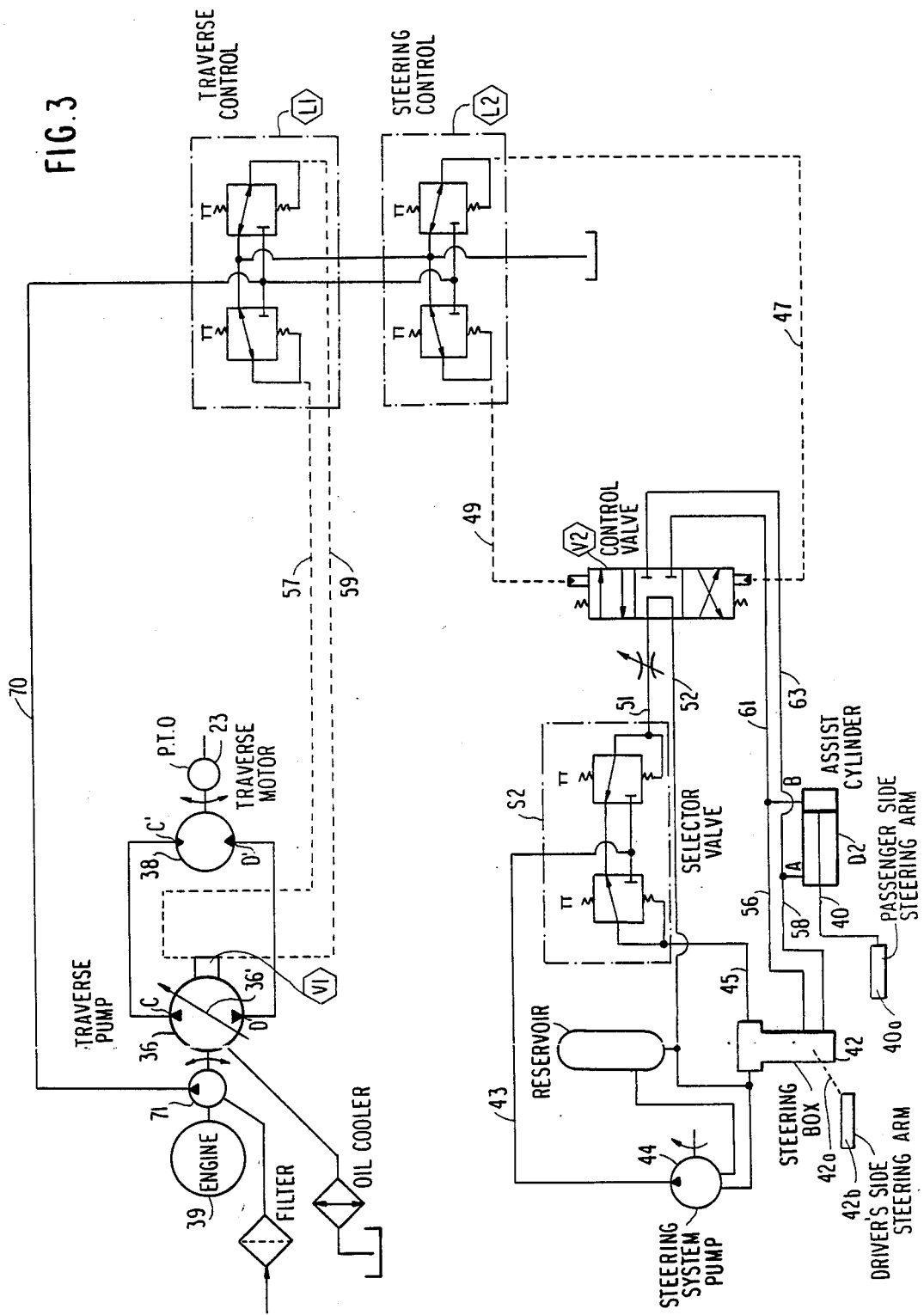
FIG. 3 is a schematic drawing of the vehicle controls for both over the road operation from the front cab and maneuvering the vehicle and discharge chute at the dispensing site.

Steering box 42 (FIG. 3) is connected by a series of linkages 42a to the driver's side steering arm 42b. (The steering arm is an integral part of the front axle.) Fluid normally flows from the vehicle's steering system pump 44 through hydraulic lines 43 to the selector valve or switch S2, and from selector valve S2 to the vehicle's steering box 42 through line 45. Steering box 42 has a hydraulic control valve built into its design. By means of this valve, fluid is sent to port A or B of the vehicle's assist cylinder D2, through lines 56 or 58. The assist cylinder's piston 40 is connected directly to the passenger side steering arm of the front axle. When the operator activates switch S2 in the cab, FIG. 3, switch functions to divert the normal flow of oil of the power steering pump 44 from steering box 42 and allows oil to flow to a high pressure hydraulic control valve V2 through line 51 and an optional check valve 52. From control valve V2 flow can be diverted to ports A or B of the assist cylinder D2 through lines 61 or 63. V2 is connected to rear platform steering control valve L2 on panel 20 through low pressure lines 47 and 49. At this point, the control of the vehicle has been transferred from the front cab to the rear panel 20 mounted on the rear platform 18.

Figure 5:
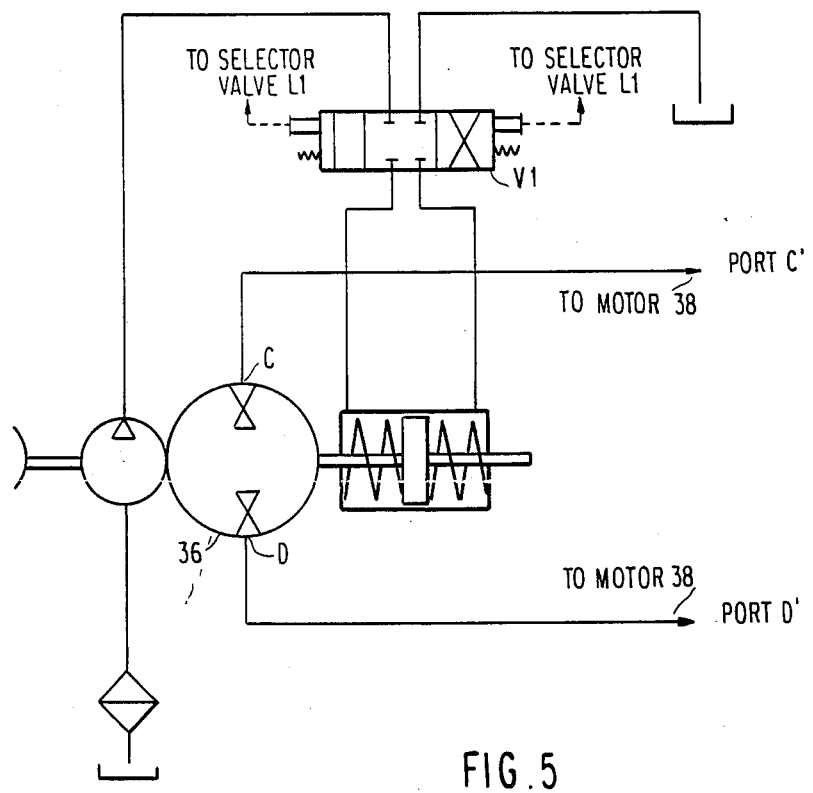
FIG. 5 is a schematic drawing of a control for effecting traverse operation of the vehicle from a rear platform.

The operator upon seating himself on seat 21 of the rear platform 18 will activate directional control valve L1 on panel 20 which activates directional control valve V1, FIG. 5, through low pressure lines 57 and 59 which are supplied with low pressure hydraulic control fluid via line 70 connected to the charge pump 71 driven by diesel engine 39. The valve V1 is built into the high pressure hydraulic pump 36, FIGS. 3 and 5, which is also driven by diesel engine 39 and; which operates to drive the hydraulic motor 38. The power from hydraulic motor 38 is transmitted through the power takeoff 23 to the vehicle transmission and drive train. The directional control L1, which is connected via valve V1 to the pump 36 whose ports C and D are connected to corresponding ports of motor 38, also controls the speed of the motor 38 by controlling the angle of a swash plate 36 also built into pump 36. These corresponding ports are labeled C' and D' in the drawing. That is, L1 is a low pressure proportional valve which when progressively opened will allow a greater amount of through pump 36 to the motor 38, fluid to pass through valve V1 to the motor 38 whereby the vehicle speed is increased or decreased either in the forward or rearward mode operation. (The dashed lines 47, 49, 57 and 59 are used in FIG. 3 to indicate low pressure hydraulic control fluid lines.) Further, L1 when in the central or neutral position (corresponding to the central or neutral position of the swash plate 36' in pump 36) provides dynamic braking to hold the vehicle stationary. Under normal highway steering conditions, the operator uses the steering wheel, with a shaft connected to the steering box 42.

On entering the cab 12, the operator deactivates the rear control steering system and returns to the front drive mode.

While the invention has been described with regard to a preferred embodiment thereof, it will be appreciated to those skilled in the art that numerous changes may be made in the controls without departing from the spirit and scope of the invention.

What I claim is:

1. In a rear discharge concrete mixer vehicle of the type having: a cab for an operator of the vehicle; a rotatable mixer drum; a discharge chute associated with the mixing drum for discharging mixed materials; a vehicle engine; a vehicle transmission connected to the vehicle drive train; a vehicle clutch lever for disengaging the engine from the transmission; a vehicle steering wheel connected via a vehicle steering box, a vehicle power steering system pump and a steering assist cylinder to a vehicle steering arm of the vehicle; a vehicle brake pedal connected to the vehicle wheel-braking system; and a power take-off connectable to said transmission, the improvement comprising:

manually operable selector means (S1, S2) in the cab (12) for disengaging said vehicle transmission from said vehicle engine (39), for connecting said power take-off (23) to the disengaged transmission and for providing an auxiliary control path (61, 62), bypassing said vehicle steering box (42), between said vehicle steering system pump (44) and said vehicle steering assist cylinder (D2);

hydraulic pump means (36, 71), mounted on the vehicle, for providing both a supply of hydraulic working fluid and a supply of hydraulic control fluid;

bidirectional hydraulic motor means (38), which is driven by the hydraulic working fluid from said hydraulic pump means (36) and which is connected to said power take-off, for driving the vehicle in opposite directions and for braking motion of the vehicle;

first bidirectional control valve means (V1) coupled between said hydraulic pump means (36) and said hydraulic motor means (38) for controlling the direction and magnitude of the flow of hydraulic working fluid from said hydraulic pump means to said hydraulic motor means;

second bidirectional control valve means (V2) connected in said auxiliary control path (61, 63) between said vehicle steering system pump (44) and said vehicle steering assist cylinder (D2);

auxiliary vehicle-control means (L1, L2) mounted on the rear of said vehicle; and means (70) for supplying the hydraulic control fluid to said auxiliary control means (L1, L2);

said auxiliary control means comprising:

manually operable, auxiliary vehicle-transverse control means (L1) for controlling the hydraulic control fluid supplied to said first bidirectional control valve means (V1) to control said first control valve means (V1) in such a manner that the rotation direction, speed and braking of said hydraulic motor means (38) are controlled to drive the power take-off (23) correspondingly to control the direction, speed and braking of the resulting motion of the vehicle, all independently of the vehicle engine (39) and vehicle wheel-braking system; and manually operable, auxiliary vehicle-steering control means (L2) for controlling the hydraulic control fluid supplied to said second bidirectional control valve means (V2) in such a manner as to control the power steering fluid supplied to said steering assist cylinder (D2), thereby controlling the steering of the vehicle independently of said vehicle steering box (42).

2. The improvement as defined in claim 1, further comprising:

air cylinder means (C1) having a piston (26) for moving said clutch lever (27) to a position wherein said vehicle transmission is disengaged from said vehicle engine (39); and wherein:

said vehicle power take-off is an air-controlled power take-off (23); and said manually operable selector means comprises a manually operable pneumatic control valve means (S1) for operating said air cylinder and said air-controlled power take-off for respectively (1) moving said clutch lever to disengage said transmission from said engine and (2) connecting said power take-off (23) to the disengaged transmission.

3. The improvement as defined in claim 2, wherein:

said manually operable selector means further comprises a manually operated selector valve means (S2), disposed in said auxiliary control path (61, 63), for selectively permitting power steering fluid from said vehicle steering system pump (44) to flow through said auxiliary control path.

4. The improvement as defined in claim 1. 2 or 3, wherein:

said manually inoperable, auxiliary vehicle-traverse control means (L1) comprises a first manually operable lever, mounted on a rear control panel (20) of the vehicle, for manually controlling the hydraulic control fluid supplied to said first bidirectional control valve means (V1); and said manually operable, auxiliary vehicle-steering control means (L2) comprises a second lever, also mounted on said rear control panel (20), for manually controlling the hydraulic control fluid supplied to said second bidirectional control valve means (V2).

5. The improvement as defined in claim 4, wherein said hydraulic motor means (38) has first and second input ports for receiving the hydraulic working fluid from said hydraulic pump means (36), and wherein said first lever is manually operable: to a first position for controlling said first bidirectional control valve means (V1) to a position wherein the relative pressures of the hydraulic working fluid applied to said first and second input ports (C,D) are such as to cause said hydraulic motor means (38) to rotate in a first direction; to a second position for controlling said first bidirectional control valve (V1) to a position wherein the relative pressures of the hydraulic working fluid applied to said first and second input ports (C,D) are such as to cause said hydraulic motor means to rotate in the opposite direction; and to a neutral position wherein the relative pressures of the hydraulic working fluid applied to said two input ports (C,D) are equal, thereby braking both the hydraulic motor and the vehicle drive train to a stop independently of the vehicle wheel-braking system.

6. The improvement as defined in claim 5, wherein said vehicle assist cylinder (D2) has two input steering ports (A,B), and wherein said second lever is manually operable to a first position to cause said second bidirectional control valve means (V2) to move to a position to cause the power steering fluid from said steering system pump (44) to be supplied to said steering input ports (A,B) in such a manner as to turn the vehicle's wheels, independently of said steering box (42), in a first direction, and wherein said second lever is operable to a second position to cause said second bidirectional control valve means (V2) to move to a position to cause the power steering fluid to be supplied to said steering input ports (A,B) in such a manner as to turn the vehicle's wheels in the opposite direction independently of the vehicle steering box (42).

7. The improvement as defined in claim 1, wherein: said manually operable selector means further comprises a manually operated selector valve means (S2), disposed in said auxiliary control path (61, 63), for selectively permitting power steering fluid from said vehicle steering system pump (44) to flow through said auxiliary control path.

8. In a vehicle of the type having: a cab for an operator of the vehicle; a vehicle engine; a vehicle transmission connected to the vehicle drive train; a vehicle clutch lever for disengaging the engine from the transmission; a vehicle steering wheel connected via a vehicle steering box, a vehicle power steering system pump and a vehicle steering assist cylinder to a steering arm of the vehicle; a vehicle brake pedal connected to the vehicle wheel-braking system; and a power take-off connectable to said transmission, the improvement comprising:

first manually operable control means in the cab for moving the clutch lever to a position wherein the engine is disengaged from the transmission, and for connecting said power take-off to the disengaged transmission;

second manually operable control means in the cab for providing an auxiliary control path, by-passing said vehicle steering box, between said vehicle steering system pump and said vehicle steering assist cylinder;

hydraulic pump means mounted on the vehicle for providing hydraulic fluid under pressure;

hydraulic motor means coupled between said hydraulic pump means and said power take-off;

manually operable traverse control means, mounted on a rear platform of the vehicle and coupled to said hydraulic pump means, for controlling the speed, direction and braking of said hydraulic motor means and, thereby, the speed, direction and braking of the motion of said vehicle, all independently of the vehicle engine and the vehicle wheel-braking system; and manually operable steering control means, mounted on said platform and coupled to said auxiliary control path, for diverting the flow of power steering fluid from said vehicle steering box to said auxiliary control path and said vehicle assist cylinder, thereby disabling said steering box and controlling the steering of the vehicle independently of said steering box.

* * * * *

UNITED STATES PATENT AND TRADEMARK OFFICE
CERTIFICATE OF CORRECTION

PATENT NO.  : 4,846,581

DATED       : July 11, 1989

INVENTOR(S) : Jan A. Osterlund and Leroy G. Scatchard

It is certified that error appears in the above-identified patent and that said Letters Patent is hereby corrected as shown below:

On the title page;

[75] Please correct the spelling of "Leroy C. Scatchard" to --Leroy G. Scatchard--.

Signed and Sealed this

Fourth Day of December, 1990

Attest:

HARRY F. MANBECK, JR.

Attesting Officer

Commissioner of Patents and Trademarks